INVENTOR
ROBERT E. SCHERR,
BY J. Harold Kilcoyne
ATTORNEY

Oct. 2, 1956

R. E. SCHERR 2,764,869

MEANS FOR SYNCHRONIZING THE TRAVEL OF TWO
OR MORE TRAVELING WORK ELEMENTS

Filed Aug. 19, 1954

INVENTOR.
ROBERT E. SCHERR,
BY

United States Patent Office 2,764,869
Patented Oct. 2, 1956

2,764,869

MEANS FOR SYNCHRONIZING THE TRAVEL OF TWO OR MORE TRAVELING WORK ELEMENTS

Robert E. Scherr, Eastchester, N. Y., assignor to Origins Incorporated, Rye, N. Y., a corporation of New York Application August 19, 1954, Serial No. 450,924

10 Claims. (Cl. 60—97)

This invention relates to improvements in means for synchronizing the travel of two or more traveling work elements operating under high load differentials and, while not limited thereto, will be described in its application to the synchronization of two hydraulic cylinders employed in raising and lowering the bed or platform of load-elevating apparatus, for the purpose of insuring equal travel of the cylinder plungers under the high load differentials likely to be encountered in the service of such apparatus due to asymmetric loading of the platform and to other causes.

It is known to synchronize to a degree the travel of two single-acting hydraulic cylinders of equal volume through the use of a so-called flow divider or equalizer consisting basically of two mechanically interconnected hydraulic gear motors having a common inlet and two outlets to the respective cylinders, such a flow divider theoretically serving to divide the flow from a common pressure line equally to the cylinders. While operating satisfactorily in applications in which equal loads are imposed on the cylinders or in which the load differentials are not of substantial magnitude, a flow-divider as aforesaid is subject to internal leakage, with the result that when the cylinders are operating under a high load differential an error in the equality of flow develops, the magnitude of which is substantially in direct proportion to the leakage differential between the gear motor units. In acknowledgement of this error, some commercially available flow dividers which use the afore-mentioned gear motor principle employ pressure balancing valves between the two sets of gears and the two outlets. The valve on one side of the divided flow is operated by a pilot pressure equal to the pressure on the other side of the divided flow and vice versa, so as to cause sufficient pressure drop to bring the normally low-pressure side up to the pressure of the high-pressure side. In this way, both sets of gear motors are working against a common inlet and common exhaust pressure, thus insuring a minimum differential error. However, though small in itself, even this minimum error may result in adverse effects in parts associated with or actuated by the cylinders, and in the case of high-lift elevating apparatus may manifest itself in undesirable stresses and strains being developed in the platform and/or its supporting structure. Further, if the apparatus is operated through repeated cycles, this error will become cumulative, and may reach severe proportions.

Broadly stated, an object of the present invention is the provision of an improved means for synchronizing the travel of, for example, two traveling elements such as hydraulic cylinders or jacks, regardless of any differential in the loads imposed thereon.

More particularly, the invention aims to and provides a means as aforesaid acting on the flow division principle as explained in the foregoing but in which the action of the flow divider functioning as a primary control of cylinder plunger travel is supplemented by a secondary control serving to remove any error as might be and usually is produced in the primary control when the cylinders are operating under high load differentials, and especially under repeated operating cycles.

A further object of the invention is the provision of an improved means for synchronizing the travel of two hydraulic cylinders or jacks designed to operate in unison but likely to be subjected to unequal loads, which combines a primary control functioning normally to provide for equal travel of the jack plungers under usual load conditions and a normally inactive secondary or supervisory control capable of sensing any inequality of jack travel and thereupon through the exercise of its control function of correcting for same.

Yet a further object of the invention is the provision of a synchronizing means as last aforesaid wherein the secondary control acts responsively to sensing any inequality of plunger travel to bleed a controlled volume of hydraulic fluid from the "high cylinder," i. e. the cylinder with the lighter load, which is such as to restore said cylinder to synchronism with the associated cylinder.

A still further object of the invention is the provision of primary and secondary control means for synchronizing the travel of two unequally loaded hydraulic cylinders through a precise control of the volume of flow of hydraulic fluid supplied to the cylinders, characterized in that the secondary control is required to handle only a small percentage of the total system flow and hence can be made highly sensitive to such error as develops in the primary control yet insensitive relative to the overall system, thereby insuring great accuracy in the system under high system rates without the consequence of hunting.

Yet another object of the invention is the provision, in a system for synchronizing the travel of two hydraulic cylinders through the use of a flow divider in the fluid supply line to said cylinders, of means for sensing and thereupon correcting for any difference in the travel of the cylinders resulting from error developing in the action of the flow divider, which in addition to being highly sensitive in its action yet insensitive relative to the system as a whole is moreover characterized by simple and inexpensive yet foolproof construction and by exceptional dependability in its action.

The above and other objects and features not specifically set forth in the foregoing will be clear from the following detailed description of the invention and the accompanying illustrative drawings, in which latter:

Fig. 1 is a perspective view of a lift truck incorporating an elevatable bed or platform shown to have been elevated to its full-raised position by a pair of hydraulic cylinders or jacks acting in vertical direction, the view illustrating one of the many possible applications of the improved means for synchronizing the travel of traveling work elements, i. e. the aforesaid jacks, operating under high load differentials according to the present invention;

Figure 1:
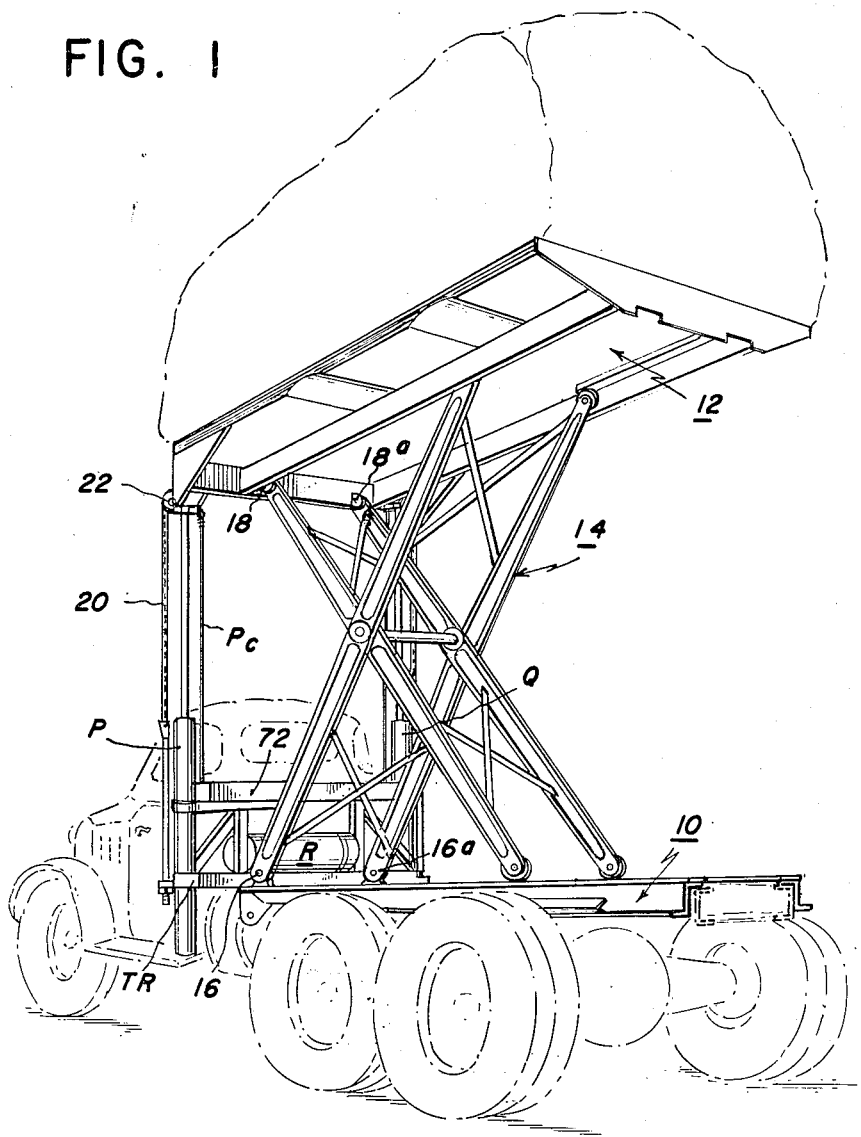

Referring to Fig. 1, such generally illustrates a lift truck incorporating bed or platform elevating means of a type disclosed and claimed in commonly-owned copending application Serial No. 450,894, filed August 19, 1954, which as shown has the form of a pre-assembled high-lift unit capable of being installed complete to the chassis of a standard automatic truck. As explained in said application, the high-lift unit comprises a sub-frame 10 of a design such that it can be lowered on to the truck chassis and secured as by bolting thereto; an elevatable bed or platform 12 disposed above and supported from the sub-frame by an X-structure generally designated 14 which provides a straight-line linkage mechanism for maintaining the platform horizontal throughout its vertical travel; and a pair of truss-mounted hydraulic jacks P and Q acting in vertical direction between the pivoted terminations 16, 16a and 18, 18a of the X-structure, for applying vertical lift to the platform. Rather than being connected directly to the platform, the jacks P and Q apply their lifting effect thereto through flexible tension means illustratively comprising one or more flexible chains 20 anchored at their one ends and being trained or doubled over sheaves 22 journaled to the upper ends of the jack plungers so that their other ends which are affixed to the platform extend below said upper ends a distance which substantially equals jack piston or plunger travel. By this arrangement, platform travel twice the travel of the jack plungers is attained.

In such an illustrated apparatus, as well as in many other applications where a platform or the equivalent is actuated throughout a predetermined path of travel by a pair of spaced hydraulic cylinders or jacks, it is highly desirable for proper stress distribution throughout the apparatus that the travel of the jacks be synchronized even under conditions of high differentials between the loads imposed on the respective jacks consequent to asymmetrical loading of the platform, to heavy loads being accidentally dropped to the platform to a side of its longitudinal center, and to other causes. Moreover, in the illustrated apparatus wherein platform travel twice that of jack plunger travel is achieved, it will be appreciated that any inequality in jack or cylinder travel manifests itself in the platform and/or its supporting structure with doubled effect.

Figure 2:
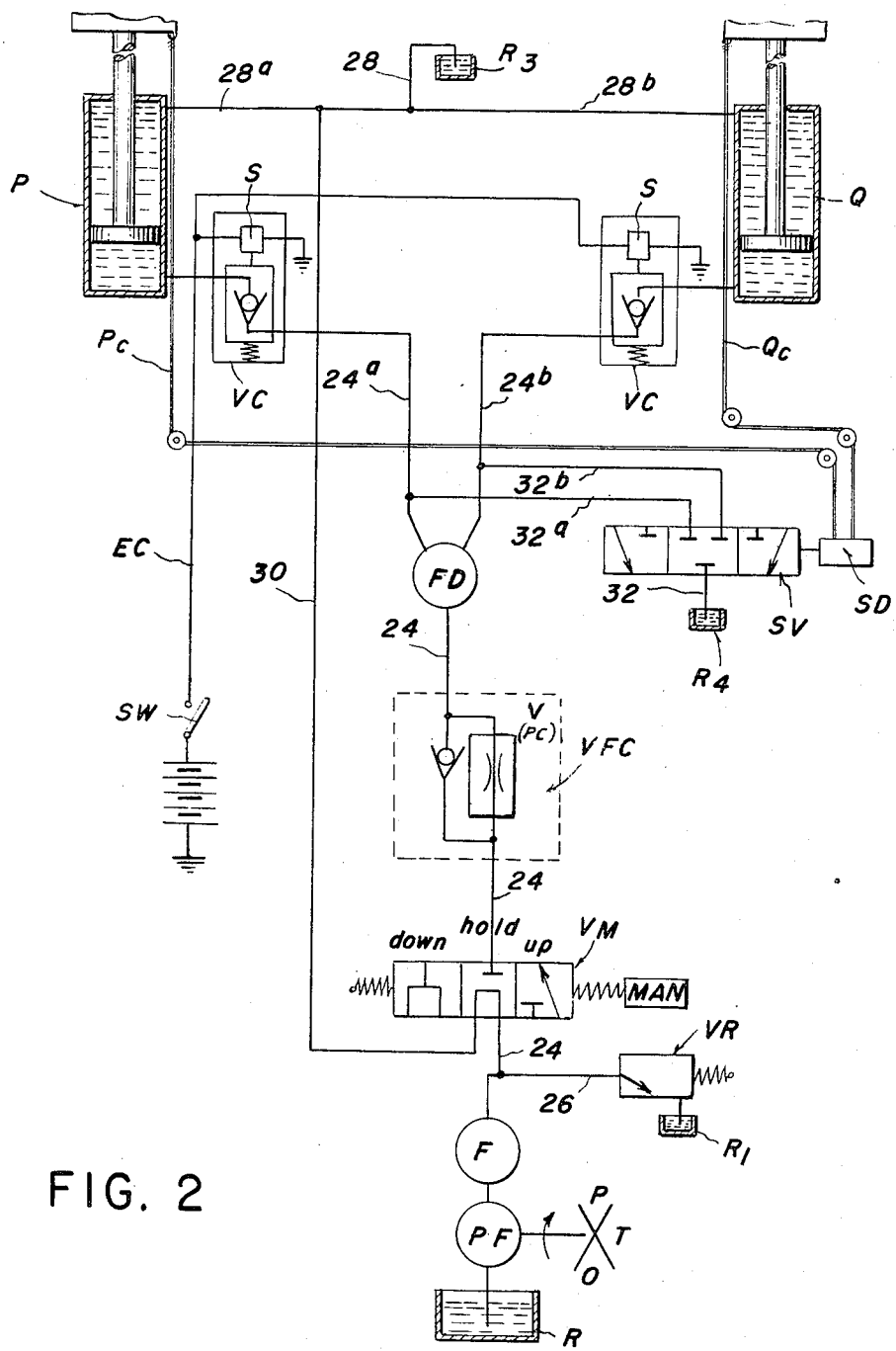
Fig. 2 is a schematic lay-out of hydraulic jack synchronizing means of the invention.

Synchronization and hence equal travel of the hydraulic jacks P and Q is achieved in simple and effective manner by the means now described. Referring to Fig. 2 which it will be understood is schematic both of the overall hydraulic system employed in supplying hydraulic pressure fluid to the opposite ends of a pair of double-acting hydraulic jacks or cylinders of equal volume and of the controls associated therewith for insuring equal travel of the jack pistons and hence of their plungers, the jacks to be synchronized may correspond exactly to the aforesaid jacks P and Q (Fig. 1) and hence have been similarly designated. Hydraulic pressure fluid from a reservoir R is pumped under pressure by a pump PF which may be driven through a standard power take-off PTO from the truck engine or other convenient source of power to a common pressure supply line 24. Connected in series in said line are a filter F; a manually controlled three-way valve VM which may be of the open-center single-spool type manufactured by Parker Appliance Co., Los Angeles, California; a pressure-compensated flow control valve VFC serving to maintain a near-constant rate of return flow in line 24 (when the valve VM is in "down" position as will be explained) regardless of the load on the jacks, and which may be of the type manufactured by Benton Harbor Engineering Works, Benton Harbor, Michigan; and a so-called hydraulic flow equalizer or divider FD, which may be of the type manufactured and sold under the name of "Pesco Flow Equalizer" by Pesco Products Division of Borg-Warner Corporation, Bedford, Ohio. Connected into the supply line 24 between the filter F and the three-way valve VM is a by-pass line 26, in which is in turn connected a relief valve VR discharging to a reservoir R1 which while shown to be separate from is preferably the same as the aforesaid reservoir R. The valve VR may be an integral part of the aforesaid valve VM, thus to require no external piping.

As is well known, a flow divider FD of the type specified comprises two hydraulic gear motors mechanically interconnected so as to rotate in unison, said motors being supplied through a common inlet and delivering to two outlets. Connected between the gear motors and the two outlets may be pressure balancing valves requiring both sets of gear motors to work against the same fluid pressure. These valves may be an integral part of the flow divider. The aforesaid common inlet is connected to the supply line 24, and the outlets are connected to branch lines 24a, 24b, in turn connected to the lower ends of the cylinders of the jacks P and Q, respectively. Accordingly, under normal conditions the flow divider is adapted to supply equal volumes of hydraulic fluid at the pressure to which the system is set to the lower ends of the jack cylinders.

To the upper ends of said cylinders are connected branch lines 28a, 28b, connected by a common line 28 to a reservoir R3 shown to be separate from but which also is preferably the same as the reservoir R. Also connected to the aforesaid lines 28a, 28b and hence to the upper ends of the cylinders is a line 30 adapted to be connected to the main pressure supply line 24 through the valve VM.

At this point it will be observed that the branch lines 24a, 24b feed to the lower ends of the jack cylinders through check valves VC which normally function to prevent back flow of hydraulic fluid in the cylinders. However, the aforesaid check valves may be electrically unseated so as to permit this return flow, as by associated solenoids s connected in a common electrical circuit EC adapted to be energized upon closing of a normally open switch SW.

The aforesaid three-way valve VM may be manually operated to one of three positions, as follows:

"Up" position, in which it passes high pressure fluid at the system pressure through line 24 to the flow divider FD, and thence equally to the lower ends of the jack cylinders P and Q, and simultaneously blocks off supply of pressure fluid to the upper ends of the cylinders through the aforesaid line 30, said upper ends meantime exhausting through lines 28a, 28b and 28 to the reservoir R. Thus, in the "up" position of the valve VM, the jacks apply lifting effect to the platform 12 or equivalent. It will be noted here that the system pressure is determined by the load on the jacks, with a maximum value determined by the relief valve setting. In the "up" position, pressure fluid by-passes the variable restriction in the flow control valve VFC through a ball-check valve which is an integral part of said flow control valve.

"Hold" position, in which the valve VM blocks off that part of line 24 leading to the flow divider, and simultaneously connects the fluid in that part of line 24 coming from the pump to the reservoir via lines 30 and 28. In this position, the platform or equivalent is held raised at the desired elevation.

"Down" position, in which the valve VM establishes communication between the pressure line 24 and line 30, whereupon, assuming that the check valves VC have been unseated, the lower ends of the cylinders exhaust through branch lines 24a, 24b, flow divider FD, pressure-compensated flow control valve VFC, valve VM to line 30. When the jack plungers are lowering, part of the fluid flowing through line 30 goes into the increasing volume in the top of the cylinder jacks, which now act as auxiliary reservoirs. The remainder of the fluid passes to the main reservoir through line 28. Any fluid being supplied by the pump will also pass via lines 30 and 28 to the upper ends of the cylinder jacks and to the main reservoir. The unseating of the check valves VC necessary to permit the lower ends of the cylinders to exhaust is effected by a connection (not shown) between the valve VM and the switch SW, of a type to be activated when said valve is moved to its aforesaid "down" position, thus insuring unseating of the check valves, before throttling action occurs in the spool of valve VM. Pressure fluid passing through the flow control valve VFC in the "down" position is restricted to permit a predetermined near-constant rate of flow regardless of cylinder fluid pressure. This action is effected by cylinder pressure fluid acting on a spring-loaded piston which in turn operates a calibrated grooved plunger to maintain constant flow.

To the extent described, the hydraulic system for supplying equal volumes of pressure fluid to the lower ends of the cylinders, for locking the pressure fluid contained in the cylinders therein, and for bleeding fluid from the lower ends of the cylinder jack to the auxiliary reservoirs in the upper ends of cylinders and to the main reservoir, is conventional and it suffices to provide equal travel of the cylinder pistons or plungers in either direction under the conditions of equal jack loading and of the differential between the jack loadings being so small that it can safely be disregarded. However, as explained above, when the load differential is great, internal leakage through the one of the gear units of the flow divider FD whose outlet is connected to the heavier loaded jack produces an error in the division of flow and hence greater travel of the jack carrying the lesser load. While this error may be small in itself, it can nevertheless be transmitted to, and manifest itself in serious bending strains imposed on, the platform or equivalent traveling members and/or the supporting structure therefor. Also, since this error becomes cumulative during repeated operating cycles, the resultant error could be of relatively large magnitude. Accordingly, it becomes highly desirable to supplement the flow divider FD, acting as a primary system control for supplying equal volumes of pressure fluid to the jack cylinders under normal (equal) load conditions, with an additional or secondary control capable of sensing any error in or through the primary control occurring under abnormal (high load differential) conditions and of effectively removing such error.

This desideratum is achieved by the present invention through the provision of a secondary control comprising a servo-valve SV which, by reference to Fig. 2, is connected in bleed-off lines 32a, 32b providing communication between branch lines 24a, 24b and an outlet or discharge line 32 delivering to a reservoir R4 (which is shown to be separate from but is preferably the same as the reservoir R), and a servo-drive SD (Fig. 3) functioning both to sense any difference in jack piston travel and thereupon to actuate the servo-valve SV in proper direction as to open the bleed-off line 32a or 32b from the cylinder whose piston has traveled the greater amount to discharge, thereby removing the small quantity of pressure fluid from said cylinder necessary to restore equality of jack piston travel.

Figure 3:
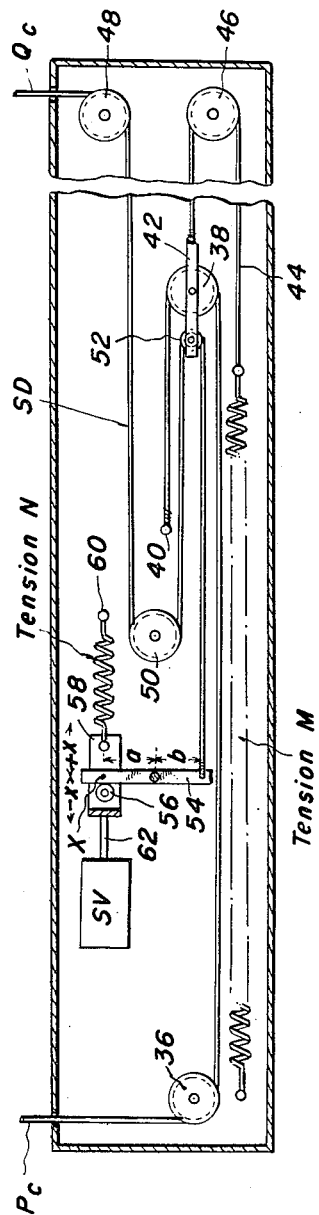
Fig. 3 is a view illustrating the servo-valve driving or actuating means which, with the servo-valve, constitute the "secondary control" of the herein proposed synchronizing means.

Referring to Fig. 3, the sensing and servo-valve actuating means SD employed herein is of the cable and pulley type and illustratively comprises cables Pc and Qc, of which the cable Pc is connected at its one end to the piston (plunger) of jack P so as to partake of linear travel therewith and being routed over a fixed-axis pulley 36 and thereafter doubled on itself by being trained over a pulley or sheave 38 and terminating at a fixed point 40. It will be observed that said sheave 38 is carried by a translating sheave carrier 42 biased so as to maintain the cable Pc under tension as by means of a tension (spring) M connected in a fixed-end cable 44 routed over a pulley 46. The cable Qc is similarly connected at its one end to the piston (plunger) of the jack Q, being shown to be routed over a fixed-axis pulley 48, thence doubled on itself by being trained over a second fixed axis pulley 50, thereafter again doubled on itself over a sheave 52 also carried by the translating sheave carrier 42, and thence being connected at its other end to the lower end of a pivoted lever 54. As shown, said lever turns on an axis extending through its mid point whereby its arms a and b have equal length, but said arms may have a ratio other than 1:1, as hereafter explained. The upper end of the lever 54 bears against a roller 56 journaled on a pin spanning the arms of a clevis member 58, which latter is biased in one direction (to the right) by a tension N, in the form of a spring reactive between a fixed point on the open end of the clevis and a fixed external point 60 preferably horizontally aligned therewith. Affixed to the clevis so as to partake of its movement is the valve stem 62 of the aforesaid servo-valve SV. It will be observed here that cable Qc is maintained under tension by the tension N acting directly on the servo-valve through the clevis 58.

In such a system as described, the tension N must exceed the total of the hydraulic and friction forces within the servo-valve SV; the tension M must always be greater than twice the tension N; and the cables Pc and Qc must be maintained under tension through the entire travel of the jack plungers (pistons). In order to hold component stress as low as possible, it is necessary also to keep M (max.), i. e. the maximum value of tension M, as near its minimum value M (min.) as possible. Thus, the spring stretch dimension for M (min.) is as large as feasible, and it will be noted that the illustrated arrangement wherein tension M has substantially linear dimension provides the latter requirement. It will be also appreciated that, since tension N acts directly on the servo-valve SV, and both cables are always under tension, there is of course no back-lash in the system.

Such a cable and pulley system is designed to and in fact produces linear motion of the designated point X on the lever 54 (and hence of the clevis 58 and valve stem 62), which is equal (assuming the lever arms $a$ and $b$ to have a 1:1 ratio) to the difference between the linear travel of any point on the lower flight of cable Pc to the left of the movable sheave 38 and of any point on the upper flight of cable Qc to the left of the movable sheave 52. Hence, by connecting the outer ends of the cables Pc and Qc to the movable jack plungers and thereby effectively to the jack pistons, any difference in travel of the latter produces linear motion of the point X equal to said difference. Of course, it should be understood that the motion at X can be multiplied or divided by the lever 54 by suitable disposition of the pivotal axis of said lever along the length thereof. Hence the action of the system can be expressed by the equation:

$$(P_t - Q_t)\left(\frac{a}{b}\right) = x$$

where $P_t$ represents the travel of the piston of the jack P, $Q_t$ represents the travel of the piston of the jack Q, $x$ represents the linear motion at point X, and $a$ and $b$ represent the lengths of the lever arms, respectively.

The aforesaid servo-valve SV is preferably of the three-way "throttling" type whose valve element is actuable through its valve stem connection to clevis 58 equally or proportionally to motion at the point X in either "plus" or "minus" direction from its normal zero or neutral position in which the valve element blocks off both the bleed-off lines 32a, 32b. In the "plus" position of the point X, the valve element, operating under rightwise bias of tension N, opens bleed-off line 32a to discharge, thereby effectively removing the small quantity of hydraulic pressure fluid from the lower end of the jack cylinder P required to restore equality of travel, i. e. to correct the error occurring in action of the flow divider FD functioning as the primary control. In the "minus" position of the point X, the valve element, operating under the bias of the tension M (which overcomes the effect of tension N) opens the bleed-off line 32b to discharge, thereby effectively removing the small quantity of pressure fluid contained in the jack cylinder Q required to restore equality of travel between the jacks. Thus, the secondary control of the invention not only senses any difference in jack travel consequent to error produced in the primary control (flow divider FD) but also through its ability to correct said error functions to restore equality of jack travel immediately upon any deviation from equality taking place.

Analysis of the secondary control as described above will also show that it is required only to handle a small percentage of the total system flow. Hence, it can be made highly sensitive to any error produced in the primary control (flow divider FD) yet insensitive relative to the overall system, which is a feature of advantage in that it insures high accuracy for the overall system (minimum load error or droop) under high system rates without the consequence of hunting. Considered mechanically, the aforesaid cable and pulley type of secondary control also has the advantage that no direct connection between the jack pistons or plungers is required, and that the point X whose travel is made to correspond with the difference in travel of the jack plungers may be remotely located with respect to the jacks, consistent with adequate routing of cables thereto. That is to say, the servo-valve SV and its driving means SD may be located with respect to the overall system at any convenient location reachable by the cables Pc and Qc.

Figure 4:
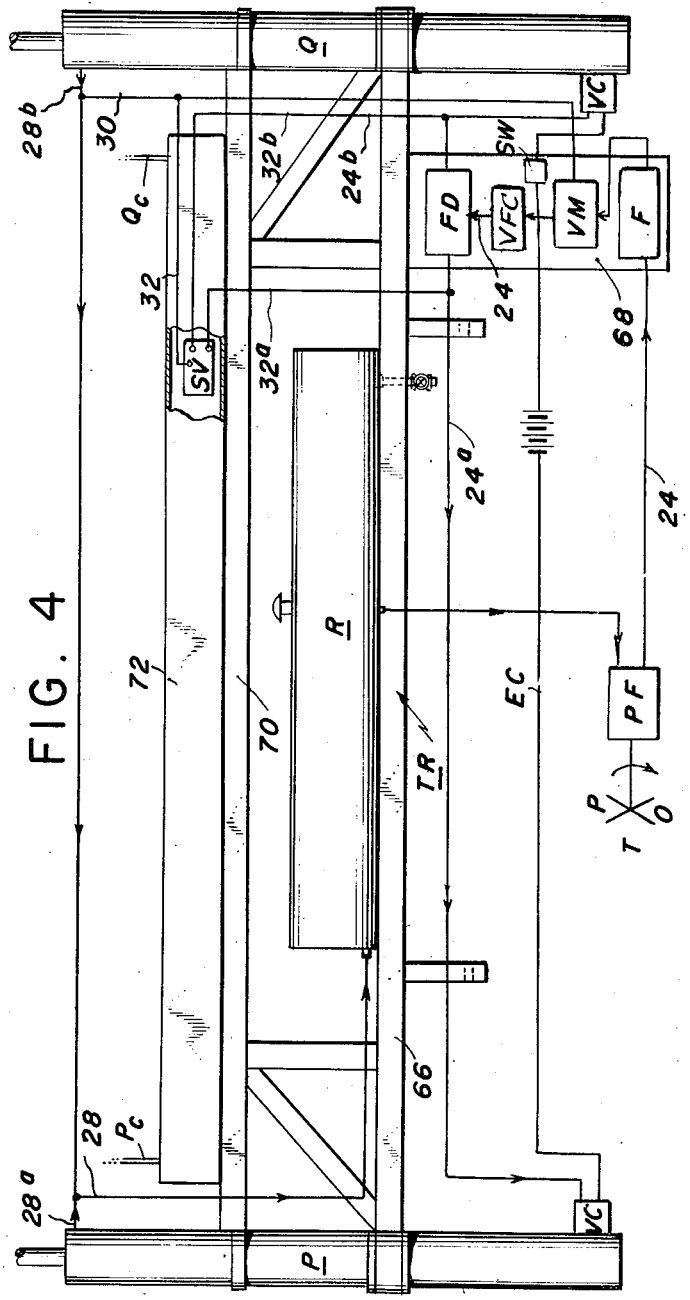
Fig. 4 is a somewhat diagrammatic view suggestive of the arrangement and hook-up of the synchronizing means of the invention with the hydraulic jacks of elevating means as shown in Fig. 1.

Referring to Fig. 4, such illustrates more or less diagrammatically the mounting and hook-up of the components, both of the overall system for supplying fluid to the jacks P and Q and the controls incorporated into the system according to the invention, on the same truss TR which mounts the jacks. This view suggests the mounting of the reservoir R on the lower cross member 66 of the truss, to which is also affixed a depending panel 68 mounting the aforesaid system components F, VM, VFC and FD, as well as the switch SW whose closing effects unseating of the check valves VC. Flexible or rigid hydraulic fluid lines in the form of tubing may be routed from and to the panel 68, the pump PF and the jacks P and Q along both the lower cross member 66 of the truss and its upper cross member 70 as well, all as generally illustrated, the tubing being secured to the truss members by any appropriate means. Preferably, the servo-valve SV and its associated drive means SD are contained within a closed box-like casing 72 affixed to the upper cross member 70 of the truss. Said casing is preferably elongated so as to extend approximately the width of the truss, such providing for substantially vertical disposition of the end portions of the cables Pc and Qc which connect to the jack pistons, and also permitting substantial linear dimension to be built into the tension M. However, it is to be understood that hook-ups and physical arrangements and mountings of the system and control components other than that illustrated may be employed, depending on the particular installation.

While not illustrated in Fig. 2, the discharge line 32 from the servo-valve SV may, instead of connecting direct to the reservoir R via the reservoir R4, dump into line 30, as indicated in Fig. 4, it being recalled that when the valve VM is in its "up" position, the line 30 connects to reservoir R through lines 28a, 28b and 28.

As many changes could be made in carrying out the above construction without departing from the scope of the invention, it is intended that all matter contained in the above description or shown in the accompanying drawings shall be interpreted as illustrative and not in a limiting sense.

I claim:

1. Means for synchronizing the travel of two traveling work elements subject to unequal loading comprising, in combination, a single means for producing travel of said work elements, a primary control associated with said single means and being constructed and arranged as theoretically to produce equality of travel of said work elements under all load conditions, and a secondary control comprising a control means mounted for linear motion and being connected to said primary control and operative responsively to its linear motion to exercise corrective action thereon upon said primary control failing to function as aforesaid under unequal loads imposed on the said work elements, and cable and pulley means operatively connected to said traveling work elements and to said control means for producing linear motion of said control means in an amount which is a function of any difference in travel of said traveling work elements under said unequal loads.

2. Means for synchronizing the travel of two traveling work elements subject to unequal loading comprising, in combination, a single means for producing travel of said elements under the various loads imposed thereon including a motion dividing means constructed and arranged as theoretically to deliver equally to said elements and functioning as a primary control, and a secondary control comprising a control means mounted for linear motion and being connected to the outputs of said motion divider and operative responsively to its linear motion to apply a correction to said outputs upon the occurrence of any deviation from equality thereof as may result from unequal loading of the work elements, and cable and tension means operatively connected to said traveling work elements and to said control means for producing linear motion of said control means in an amount which is a function of unequal travel of said elements consequent to said deviation.

3. Means for synchronizing the travel of two hydraulic cylinders operatively connected to a common member subject to unequal loading comprising, in combination, a single source of hydraulic pressure fluid, means constructed and arranged as theoretically to supply equal volumes of the pressure fluid to corresponding ends of the cylinders, and a mechanism operatively connected to said cylinders for correcting for any inequality in the volumes of pressure fluid actually supplied to the cylinders consequent to their being unequally loaded comprising means for sensing any inequality in said volumes of pressure fluid and means actuable in response to an unequality being sensed by said sensing means for bleeding off an amount of pressure fluid from the cylinder having the greater volume thereof as effects reduction of said inequality to zero.

4. Means for synchronizing the travel of two hydraulic cylinders operatively connected to a common member subject to unequal loading comprising, in combination, a single source of hydraulic pressure fluid, a pressure line connected to said source, a flow divider having its inlet connected to said line and its outlets connected to branch lines in turn connected to corresponding ends of the cylinders, said flow divider being constructed and arranged as theoretically to divide the flow of hydraulic fluid into equal volumes for delivery through said branch lines to said cylinder ends, and control means responding to any error occurring in the action of the flow divider as aforesaid to correct for same including means for sensing any inequality in the volumes of fluid being supplied to said cylinder ends, and means responsive for its actuation to the operation of the sensing means in sensing said inequality for bleeding pressure fluid from the cylinder containing the greater volume thereof thereby to restore volume equality between the cylinders.

5. Hydraulic-cylinder synchronizing means as set forth in claim 3, wherein said bleed-off means depends for its actuation on linear motion, and said sensing means comprises cable and pulley means operative to produce linear motion of said bleed-off means by an amount which is a function of any difference of the volumes of pressure fluid supplied to said cylinders.

6. Hydraulic-cylinder synchronizing means as set forth in claim 4, wherein said bleed-off means comprises a normally closed servo-valve connected to the outlets of the flow divider and to exhaust and including a valve element movable linearly from a normally closed position to positions in which it connects one or the other of said outlets to exhaust, and said sensing means comprises a cable and pulley system effectively connected to the pistons of said hydraulic cylinders and to said servo-valve, respectively, for producing linear motion of said servo-valve element to one or the other of its outlet-exhaust positions as determined by the cylinder containing the greater volume of pressure fluid.

7. In apparatus of the character described, the combination of valve means including a flow-control valve element movable linearly in opposite directions from a neutral position, a pair of cables each having one end fixed and being routed for linear travel against the bias of tension means operatively connected therein, a translating sheave carrier mounting a pair of sheaves over which the cables are respectively doubled, said tension means acting in opposite directions on the sheave carrier, and a movable member connected in one of said cables between its tension means and its sheave, said cables, said sheave carrier and its sheaves and said tension means cooperating one with another to produce motion of the movable member in direction and amount which is a direct function of any difference in the linear travel of said cables, and means operatively connecting said valve element and said movable member for converting motion of the latter into linear motion of the former.

8. Apparatus as set forth in claim 7, wherein the tension means in the other of said cables has tension effect at least twice that of the tension means in said one cable.

9. Apparatus as set forth in claim 7, wherein the tension means in the other of said cables is directly effective on said sheave carrier and indirectly effective on said other cable.

10. Apparatus as set forth in claim 7, wherein the tension means in the other of said cables is directly effective on said sheave carrier and indirectly effective on said other cable and has tension effect at least twice that of the tension means in said one cable.

References Cited in the file of this patent

UNITED STATES PATENTS

| | | |
|---|---|---|
| 604,364 | Brown | May 24, 1898 |
| 955,852 | Coyle | Apr. 26, 1910 |
| 1,999,834 | Ernst | Apr. 30, 1935 |
| 2,328,258 | Cannon | Aug. 31, 1943 |
| 2,410,603 | Dubosclard | Nov. 5, 1946 |
| 2,484,908 | Purcell | Oct. 18, 1949 |
| 2,616,265 | Wilson | Nov. 4, 1952 |